United States Patent

[11] 3,634,057

[72] Inventors Gary L. Tate;
John J. Summers; Joseph O. Kramer, all of Vincenes, Ind.
[21] Appl. No. 872,104
[22] Filed Oct. 29, 1969
[45] Patented Jan. 11, 1972
[73] Assignee Hamilton of Indiana, Inc.
Vicennes, Ind.

[54] MEANS TO SENSE AND CONTROL SPEED OF MOVEMENT OF GLASS SHEET ON GAS SUPPORT BED
7 Claims, 6 Drawing Figs.

[52] U.S. Cl. .................................................. 65/163, 65/162, 65/182 A
[51] Int. Cl. .................................................. C03b 27/00
[50] Field of Search .......................................... 65/160, 162, 163, 182 A

[56] References Cited
UNITED STATES PATENTS
3,223,501  12/1965  Fredley et al. ............... 65/182 A X
3,268,265  8/1966   Willott ........................ 302/29
3,482,954  12/1969  Yuen ............................ 65/160 X Primary Examiner—Arthur D. Kellogg
Attorney—Ralph W. Kalish ABSTRACT: A sensing element for disposition within the heating section of a system for tempering flat glass parts which are supported upon a film for hot gas comprising a tube having an end opened to the supporting gas film for subjection to a change in pressure by travel of the glass parts over such open end; there being means responsive to such pressure change for controlling the rate of travel of the glass parts through the heating section.

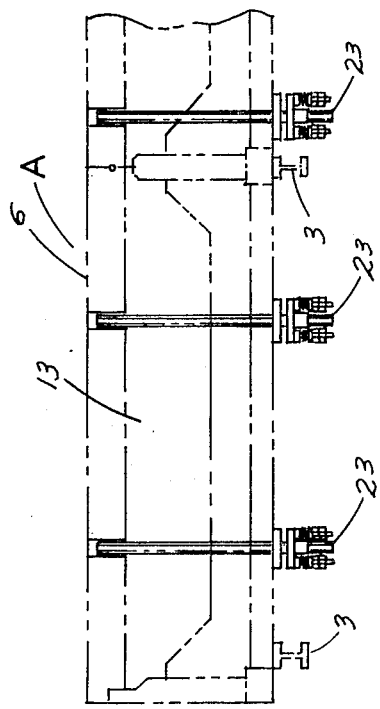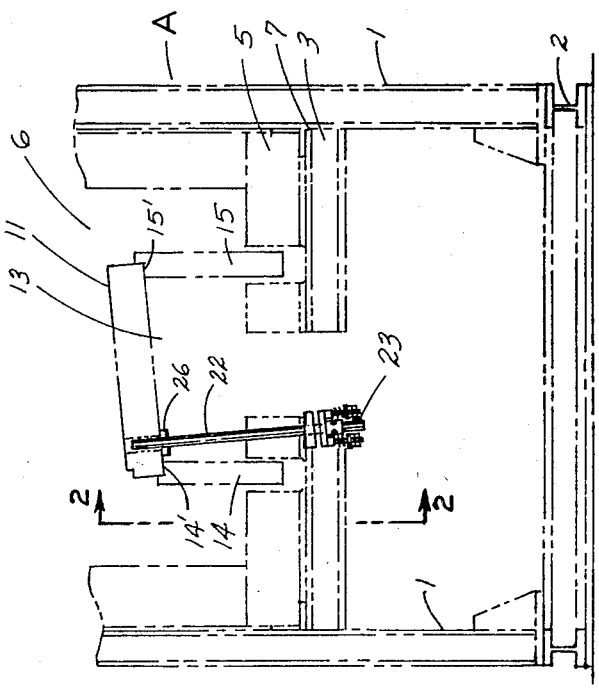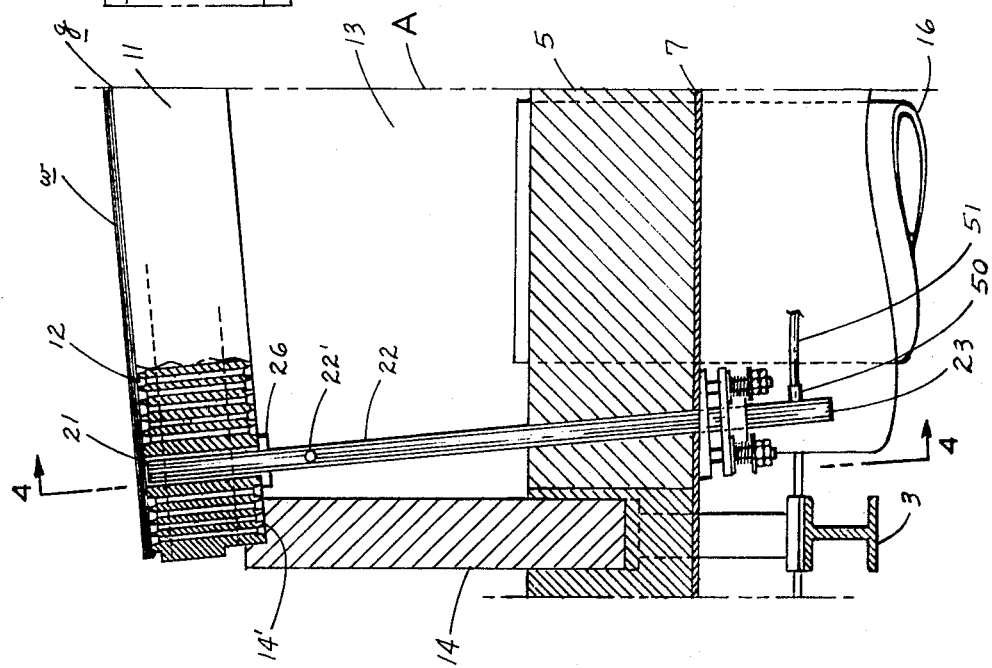

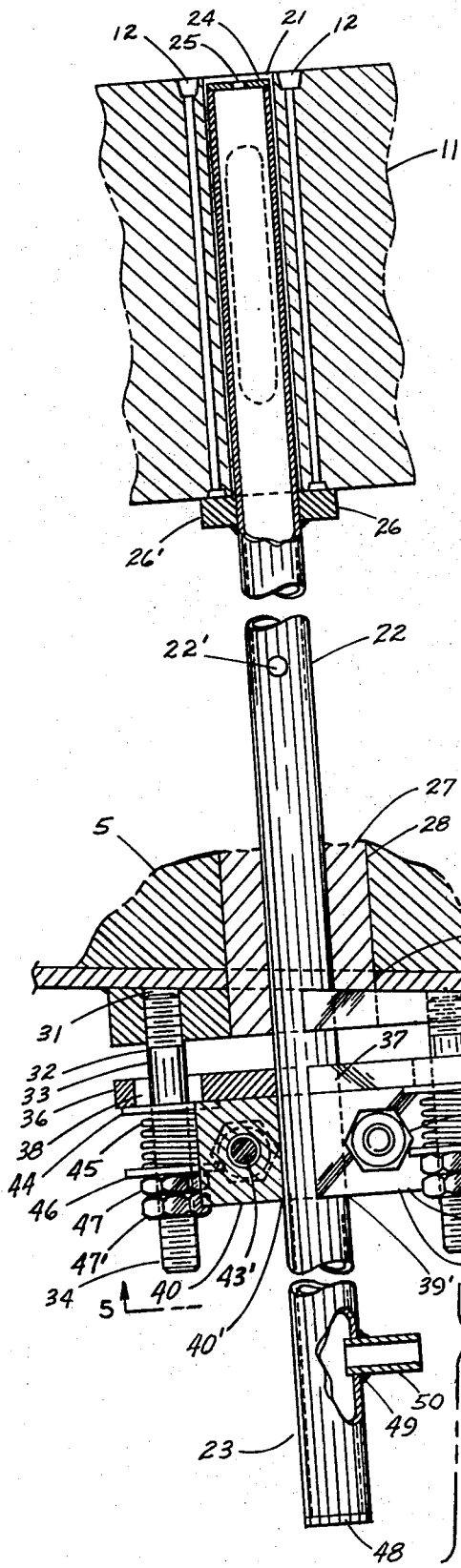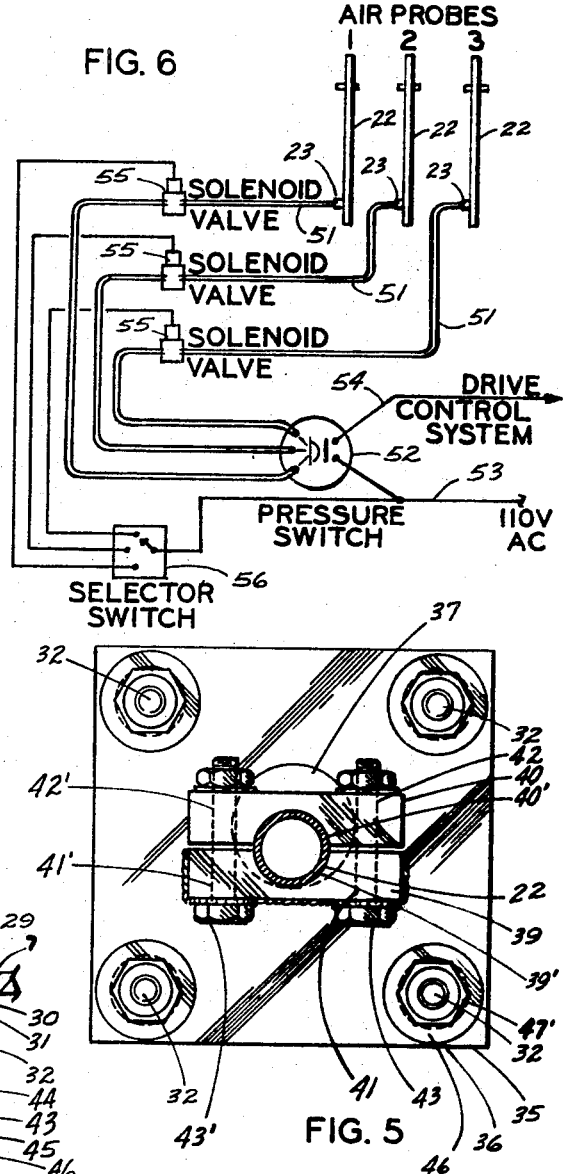

3,634,057

MEANS TO SENSE AND CONTROL SPEED OF MOVEMENT OF GLASS SHEET ON GAS SUPPORT BED

BACKGROUND AND SUMMARY OF THE INVENTION

This invention relates in general to glass tempering and, more particularly, to a sensing element for use with systems for tempering flat glass parts which are supported upon a film of hot gas.

In gas hearth systems for tempering glass wherein the flat glass parts are supported upon a film of hot gas during travel through the heating section, the transfer of the glass from the heating section to the quenching section for rapid chilling of the glass by films of cool air causes undesirable stresses to be developed within the glass as a result of a steep temperature gradient therein. In view of the construction of such heating sections, there have been no reliable means heretofore conceived for indicating the arrival of the glass parts at any predetermined point of travel to allow attendant personnel to attempt such expedients as might be considered for reducing the steepness of the aforesaid temperature range; it being recognized that accelerated movement of the glass from the heating section to the quenching section would effectively prevent such gradient with potential destructive stresses.

Therefore, it is an object of the present invention to provide a sensing element for disposition within the heating section of a glass tempering system wherein the glass being conveyed is supported upon a film of hot gas for operating a switch to cause the travel speed of the glass to be increased at a predetermined juncture within the heating section so as to hasten its delivery to the quenching section.

It is another object of the present invention to provide a sensing element of the type stated which is adapted to initiate operation through a change in the gas pressure acting thereon when the treated glass parts move thereacross.

It is another object of the present invention to provide a sensing element of the type stated which is adapted for reaction upon arrival of the treated glass parts at a specific point within the heating section so that the same may be easily connected to a variety of devices for operation thereof at such preselected juncture.

It is a further object of the present invention to provide a sensing element which may be readily installed in existing glass tempering system without requiring costly modification or time consumption necessitating unreasonable downtime of the system.

It is a still further object of the present invention to provide a sensing element of the type stated which is most economically manufactured, having a marked simplicity of parts so as to be resistant to breakdown; and which is durable and reliable in operation.

BRIEF DESCRIPTION OF THE DRAWINGS

FIG. 1 is an elevational view of a sensing element constructed in accordance with and embodying the present invention, illustrating the adjacent parts of the heating section of a glass-tempering system in phantom lines.

FIG. 2 is a fragmentary side view taken on the line 2—2 of FIG. 1.

FIG. 3 is an enlarged fragmentary view of the sensing element and adjacent portions of the heating section, taken transversely of the heating section but showing the sensing element in full lines.

FIG. 4 is a vertical transverse sectional view taken on the line 4—4 of FIG. 3.

FIG. 5 is a transverse sectional view taken on the line 5—5 of FIG. 4.

FIG. 6 is a schematic diagram illustrating the sensing element and the associated circuitry.

DESCRIPTION OF THE PREFERRED EMBODIMENT

Referring now by reference characters to the drawings which illustrate the preferred embodiment of the present invention, A generally designates the heating section of a tempering system for flat glass parts, such as, sheet, plate, and the like; said section A at one end being in communication with a preheat section (not shown) and at its other end with a quenching section (not shown), wherein the glass is rapidly chilled while suspended between opposed films of cool air. From the quenching section the tempered glass is transferred to a delivery unit (not shown) by which the same is discharged.

Heating section A comprises a conventional framework composed of stanchions 1, beams 2, girders 3, for supporting refractory blocks 4, 5 of a furnace chamber 6; there being plate members 7 fixed on girders 3 and underlying blocks 5. Furnace chamber 6 incorporates a conventional roof section formed also of refractory material and having a plurality of the usual sockets (not shown) for customarily receiving heating units (not shown) which may be of the gas fired type, connected to a source of gas, providing radiant heat within said chamber 6. It is understood that similar radiant burners are provided within the floor of heating section A for cooperating with the overhead burners to maintain a preselected temperature within furnace chamber 6, as in the order of 1,300°–1,500° F. for heating the flat glass parts up to or above the deformation temperature, that being the temperature at which the glass can be tempered.

Extending longitudinally of heating section A is a flat bed 11, as formed of ceramic or like refractory material, having throughout its extent a multiplicity of passages 12 which, at their upper ends open into furnace chamber 6, and at their lower ends 136 in communication with a plenum chamber 13 substantially coextensive with heating section A and having parallel refractory sidewalls 14, 15 suitably mounted within blocks 5 and serving on their upper ends as supports for bed 11, the lateral edges of which are received within complementary recesses 14', 15' formed at the upper ends of plenum chamber sidewalls 14, 15. Wall 14 is of less height than wall 15 so as to cause bed 11 to be presented at an angle to the horizontal, in the order of about 5°. Plenum chamber 13 is connected throughout its extent by a plurality of spaced-apart pipes 16 with a source of heated, pressurized gas; said pipes 16 extending through suitable openings in blocks 5, plate 7, and girders 3. Such pressurized gas is thus distributed by plenum chamber 13 to passages 12 for developing a gas film immediately above bed 11, as at g, for supporting flat glass, as in sheet or plate character, indicated at w, as the same travels through heating section A.

The glass workpieces w are conveyed through heating section A by various means such as a plurality of driving members or rollers (not shown) presented for rotation about a vertical axis for having their inner peripheral edge frictionally engage an edge of the workpieces w. The driving members are suitably connected by appropriate motion-transmitting means (not shown) to a prime mover (not shown). Thus, glass workpieces w are conveyed in continuous straight line travel along gas film g by virtue of the contact with said drive members, the inclined disposition of said workpieces w, through gravity, promoting maintenance of contact with said drive members. Customarily, said drive members are operated so as to cause glass workpieces w to travel relatively slowly through furnace chamber 6, as at a rate of approximately 150 inches to 175 inches per minute.

Provided within bed 11 in predetermined longitudinally spaced-apart relationship is a plurality of bores 21 for receiving the upper end of a tube 22 of a sensing element, indicated generally 23. Referring to FIG. 2, heating section A is shown as incorporating three such sensing elements 23. However, as will be developed more fully hereinbelow, any number of such elements may be incorporated and as the same are of like construction, description of the structure thereof will be restricted to a single element. Bores 21 are axially parallel to passages 12 and are hence normal to the plane of bed 11 so that tubes 22 will be similarly disposed with their major axis at right angles to the plane bed 11. The upper end of tube 22 terminates immediately beneath the upper surface of bed 11 to avoid obstructive contact with glass workpieces w moving thereacross; with such upper end being closed by an end wall 24 having a central port 25 of reduced diameter relative to the inside diameter of tube 22. To limit the extension of tube 22 within its related bore 21 there are fixed to the exterior wall of said tube 22 a pair of diametrically opposed detents or stops 26, 26' for abutment against the under face of bed 11 (see FIG. 5). As shown in FIG. 4, said bores 21 are presented proximate the lower side of bed 11, that is, immediately adjacent plenum chamber wall 14 in order to assure that the same will underlie glass workpieces w regardless of the transverse extent thereof.

Tube 22 extends downwardly through plenum chamber 13 and through a sleeve 27 mounted within aligned openings 28, 29 in blocks 5 and plate 7, respectively, for projection beneath the latter. Beneath bed 11 within plenum chamber 13, tube 22 is provided in its sidewall with an opening 22', which thus establishes communication between plenum chamber 13 and furnace chamber 6. Since the air within plenum chamber 13 is under relatively increased pressure, air will thus normally enter opening 22' for discharge through port 25 into furnace chamber 6.

It is to be observed that said openings 28, 29 are formed in axial alignment with a related bore 21 to present sleeve 27 at the appropriate angle. Beneath plate 7 sleeve 27 is integral with a mounting plate fixed, as by welding, to said plate 7. The upper and lower faces of plate 7 are appropriately related for accommodating the particular angle of the axis of tube 22 to the vertical. Mounting plate 30 is of general quadrilateral contour and in each of its corner portions is provided with upwardly extending tapped recesses 31 for threadedly receiving the upper ends of depending mounting bolts 32 which latter each have smooth shank portions, as at 33, and with their lower end portions being threaded, as at 34. Tube 22 is adapted for relative axial movement with respect to said bolts 32 by means of a mounting 35 comprising an upper plate portion 36 having a central opening 37 for extension therethrough of tube 22 and being further provided with apertures 38 for extension therethrough of the shanks 33 of bolts 32; said apertures 38 being relatively increased diameter with respect to bolts 32 to prevent inadvertent binding contact therewith. Mounting 35 further includes a fixed jaw member 39 integral with plate 36 and extending from the undersurface thereof, with the jaw-forming recess thereof, as indicated at 39', is aligned with opening 37. Cooperating with member 39 is movable jaw element 40 having a jaw-forming recess 40' complementary to jaw 39' to snugly and reliably grip the intervening portion of tube 22. On opposite sides of their respective jaw-forming recesses, members 39, 40 are provided with aligned tapped openings, as at 41, 41', and 42, 42', respectively, for engagement by adjusting bolts 43, 43' for maintaining said members 39, 40 in tube-clamping relationship. The undersurface of plate 36 in the portions surrounding openings 38 are disposed upon washers 44 against the under face of which bear the upper ends of coil springs 45 of the compression type; the lower ends of said springs bearing against comparable washers 46 supported upon a pair of locknuts 47, 47' secured upon the threaded portion 34 of bolts 32. Accordingly, it will be seen that tube 22 is resiliently supported so that movement thereof in a direction axially of mounting bolts 32 may be achieved. Such floating-type mounting is designed to permit tube 22, which is preferably constructed of stainless steel, to expand by reason of the relatively high temperature within section A. Thus, springs 45 permit of such thermal expansion while urging tube 22 to return to initial condition under cooling.

At its lower end tube 22 is closed, as at 48. Upwardly of such lower end, and downwardly of mounting 35, tube 22 is provided with a lateral aperture, as at 49, within which is fixed the inner end of a fitting 50 for connecting said tube to a conduit 51 as formed of copper or like material. As is schematically indicated in FIG. 6, each of said conduits is operatively connected to a pressure switch 52 of conventional design which latter is in circuit by a lead 53 to a source of electrical power and by a conductor 54 to a motor (not shown) for actuating drive means to increase the angular speed of the driving members for accelerating the rate of linear travel of glass workpieces w through heating section A. The connection of pressure switch to such prime mover or other power sources for motion-transmitting means may be of conventional character.

The location of sensing device 23 within heating section A is determined by the particular point of travel of glass workpieces w at which acceleration of their rate is desired. It is to be recognized that since the temperature of the cool air in the quenching section is considerably less than that in heating section A, a glass workpiece w being received in said quenching section will have its leading portion subjected to a markedly lower temperature than that which its trailing section is simultaneously experiencing within heating Section A. Such situation causes the development of a rather steep temperature gradient within the workpiece w tending to cause the creation of potentially damaging stresses. Accordingly, by utilization of sensing element 23 the speed of conveyance of workpieces w within heating section A may be increased as the workpieces w approaches the quenching section so that the transfer from section A to section B may be speedily accomplished thereby minimizing the opportunity for stress development. In practice, the speed has been increased from approximately 150 inches per minute to about 650 inches per minute which has been found adequate to overcome the hazard of stress creation.

Sensing element 23 is designed to effect a closure of pressure switch 52 responsive to an increase of gas pressure within tube 22. It will be observed that when port 25 of tube 22 is open to the ambient pressure of furnace chamber 6, switch 52 will open, in which state as aforesaid, air will be moving into said furnace chamber 6 from plenum chamber 13 by travel through tube 22. However, when glass workpieces w moves across port 25, the same will cause an effective closure of port 25 so that the air normally moving therethrough from plenum chamber 13 may not escape. Thus, an immediate increase in the gas pressure within tube 22 is developed, which pressure is transmitted through fitting 50 and conduit 51 to pressure switch 52 for actuating same. As the increased pressure within tube 22 will not exceed the pressure of the air within plenum chamber 13, airflow to plenum chamber 13 is prevented and thus, the pressure release will be sought by airflow downwardly for operating pressure switch 52. Said switch 52 will be maintained in closed state as long as workpiece w is in substantial occluding relationship with port 25 so that during such interval the same will be speedily conveyed for rapid delivery to quenching section. As the trailing edge of the particular workpiece w moves beyond port 25, the pressure within tube 22 will be lowered with reestablishment of airflow through port 25 from plenum chamber 13 with switch 52 being thereby returned to open condition and causing discontinuance in the relative acceleration of the work-driving members.

Since each of the selected number of sensing elements 23 function in the same manner, it is apparent that by utilization of a plurality of same, as illustrated in FIG. 2, the conveying acceleration may be caused to operate at preselected junctures, as may be determined by the length, thickness, or the like of the workpiece w.

FIG. 6 illustrates the provision within the related conduit 51 of each sensing element 23, of a multiple element assembly, of a solenoid valve 55 with the same being connected to a selector switch 56. The operator may be appropriate setting of selector switch 56 condition the related sensing element 23 for operation while simultaneously rendering the remaining elements inoperative. By this arrangement extreme versatility is provided so that the desired enhancement of speed may be achieved at any of the corresponding points along the path of workpiece travel.

It is evident from the foregoing that sensing element 23, together with the associated pressure switch 52, may be readily utilized for other purposes than accelerating the movement of the glass workpiece *w*. For example, pressure switch 52 could be connected to a visual or audio signal so as to indicate to an operator the arrival of the workpiece at a specific point within the heating section A for such further purpose as may be requisite with respect to any particular operation.

Accordingly, the present invention provides a reliable means for accelerating the travel of the workpieces at a predetermined point without the interposition of services of personnel and which element is of such simple construction that the same is substantially resistant to breakdown.

Having described our invention what we claim and desire to obtain by Letters Patent is:

1. For use in a heating section of a glass-tempering system having a bed, means for providing a film of hot gas above said bed for supporting flat glass parts for tempering thereof, and driving elements engaging said glass parts for causing travel of the same through the heating section, the improvement comprising means defining a tubular member, said tubular member being disposed for presenting its upper end proximate the upper surface of said bed for subjecting its upper end to the ambient pressure thereabove, a pressure-sensitive switch, means connecting said tubular member and said pressure-sensitive switch for effecting switch operation responsive to an increase in the ambient pressure, and means connecting said pressure switch and said driving members whereby upon closure of said switch the speed of said driving members will be increased for accelerating the rate of travel of the glass parts through said heating section.

2. The invention as defined in claim 1 and further characterized by said tubular member having an end closure at its upper end, a port provided in said end closure of relatively reduced diameter, and means for preventing extension of said tubular member above said bed.

3. The invention as defined in claim 1 and further characterized by there being a plurality of tubular members arranged in longitudinally spaced-apart relationship, said connecting means connecting each of said tubular members and said pressure-sensitive switch, and means for selectively establishing communication between one of said tubular members and said pressure-sensitive switch.

4. For use in a heating section of a system for tempering glass having a bed, means for providing a film of hot gas above said bed for supporting flat glass parts for tempering thereof, means for presenting said bed at an angle to the horizontal so that one edge of said glass parts will be lower than the other, a plurality of driving elements engaging the lower lateral edge of said glass parts for causing travel of same through the heating section, the improvement comprising: means defining a tubular member; said bed having a bore axially perpendicular to the plane of said bed; the upper portion of said tubular member extending into said bore; the upper end extremity of said tubular member terminating below the upper surface of said bed; a closure provided across the upper end of said tubular member; a port provided in said end closure for subjecting said tubular member to the ambient pressure; a pressure switch; means connecting said tubular member and said pressure switch whereby the latter is closed upon an increase of the ambient pressure to which its tubular member is subjected; and means connecting said pressure switch and said driving members whereby upon closure of said switch the speed of said driving members will be increased for accelerating the rate of travel of the glass parts through said heating section.

5. For use, in a heating section of a system for tempering glass having a bed, means for providing a film of hot gas above said bed for supporting flat glass parts for tempering thereof, means for presenting said bed at an angle to the horizontal so that one edge of said glass parts will be lower than the other, a plurality of driving elements engaging the lower lateral edge of said glass parts for causing travel of same through the heating section, the improvement comprising: means defining a plurality of tubular members; said bed having a plurality of bores corresponding in number to said tubular members and being axially perpendicular to the plane of said bed; the upper portion of each tubular member extending into the related bore; the upper extremity of each tubular member terminating below the upper surface of said bed; a closure provided across the upper end of each tubular member; a port provided in each end closure for subjecting the associated tubular member to the ambient pressure; a pressure switch; means connecting each tubular member and said pressure switch whereby the latter is closed upon an increase of the ambient pressure to which the connected tubular member is subjected; selector means located within said means connecting each tubular member of each pressure switch for selectively establishing communication between one tubular member and said pressure switch; and means connecting said pressure switch and said driving members whereby upon closure of said switch the speed of said driving members will be increased for accelerating the rate of travel of the glass parts through said heating section.

6. The invention as defined in claim 5 and further characterized by said bores being presented in spaced-apart relationship longitudinally of said bed and being located beneath the portion thereof over which the glass parts travel whereby said tubular members are disposed along a path of travel of said glass parts for indicating progressive location of the same during such travel.

7. The invention as defined in claim 5 and further characterized by said selector means comprising a switch element, there being a solenoid valve within said means connecting each tubular member and said pressure switch, said switch element being engaged to each of said solenoid valves whereby upon operation of the latter selected valves may be energized to effectively close the connecting means to the nonselected tubular members.

\* \* \* \* \*